(12) United States Patent
Donderici et al.

(10) Patent No.: US 10,662,758 B2
(45) Date of Patent: May 26, 2020

(54) MULTIPLE-DEPTH EDDY CURRENT PIPE INSPECTION WITH A SINGLE COIL ANTENNA

(71) Applicant: Halliburton Energy Services, Inc., Houston, TX (US)

(72) Inventors: Burkay Donderici, Houston, TX (US); Luis Sanmartin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/144,701

(22) Filed: Sep. 27, 2018

(65) Prior Publication Data

US 2019/0040734 A1 Feb. 7, 2019

Related U.S. Application Data

(63) Continuation of application No. 14/890,004, filed as application No. PCT/US2015/037631 on Jun. 25, 2015, now abandoned.

(Continued)

(51) Int. Cl.
*G01B 7/06* (2006.01)
*G01N 27/90* (2006.01)
(Continued)

(52) U.S. Cl.
CPC .......... *E21B 47/0006* (2013.01); *E21B 47/00* (2013.01); *E21B 47/0905* (2013.01);
(Continued)

(58) Field of Classification Search
CPC ........ G01N 27/82; G01N 27/83; G01N 27/90; G01N 27/9006; G01N 27/9013;
(Continued)

(56) References Cited

U.S. PATENT DOCUMENTS

| 4,430,615 A * | 2/1984 | Calvert .............. G01N 27/9033 324/239 |
| 5,736,860 A * | 4/1998 | Chaillout ................. G01V 3/28 324/339 |

(Continued)

FOREIGN PATENT DOCUMENTS

| WO | 95000839 A1 | 1/1995 |
| WO | 2011000500 A1 | 1/2011 |

(Continued)

OTHER PUBLICATIONS

Haugland, S.M., Fundamental Analysis of the Remote-Field Eddy-Current Effect, IEEE Transactions on Magnetics, vol. 32, No. 4, 1996.

(Continued)

*Primary Examiner* — David M Schindler
(74) *Attorney, Agent, or Firm* — McGuireWoods LLP

(57) ABSTRACT

A method includes introducing a pipe inspection tool into a first pipe positioned within a wellbore and further positioned within at least a second pipe. The pipe inspection tool includes an electromagnetic sensor having a coil antenna that includes a coil winding extending axially along at least a portion of the electromagnetic sensor. An excitation signal is transmitted between a first terminal and a second terminal of the coil antenna. A first response signal is measured between a third terminal and a fourth terminal of the coil antenna, wherein at least one of the third and fourth terminals is different from the first and second terminals. The first response signal is then processed to determine a characteristic of the first pipe.

6 Claims, 8 Drawing Sheets

Related U.S. Application Data

(60) Provisional application No. 62/023,490, filed on Jul. 11, 2014.

(51) Int. Cl.
  *G01V 3/28* (2006.01)
  *E21B 47/00* (2012.01)
  *E21B 47/09* (2012.01)

(52) U.S. Cl.
  CPC ............... *G01B 7/10* (2013.01); *G01N 27/90* (2013.01); *G01V 3/28* (2013.01)

(58) Field of Classification Search
  CPC ............ G01N 27/902; G01N 27/9033; G01N 27/904; G01N 27/9046; G01N 27/9073; G01V 3/18; G01V 3/26; G01V 3/28; E21B 47/0006; E21B 47/0905; G01B 7/06; G01B 7/10
  See application file for complete search history.

(56) References Cited

U.S. PATENT DOCUMENTS

| | | | |
|---|---|---|---|
| 6,534,976 B2 * | 3/2003 | Tasca | G01N 27/9046 324/220 |
| 7,560,920 B1 | 7/2009 | Ouyang et al. | |
| 2002/0105333 A1 | 8/2002 | Amini | |
| 2007/0034374 A1 | 2/2007 | Gerez et al. | |
| 2008/0191706 A1 | 8/2008 | Burnett et al. | |
| 2009/0195244 A1 | 8/2009 | Mouget et al. | |
| 2010/0134113 A1 | 6/2010 | DePavia et al. | |
| 2010/0219818 A1 | 9/2010 | Fischer | |
| 2010/0308832 A1 | 12/2010 | Clark | |
| 2011/0204896 A1 | 8/2011 | Zhang | |
| 2011/0316542 A1 | 12/2011 | Frey et al. | |
| 2012/0095686 A1 | 4/2012 | Legendre et al. | |
| 2013/0193953 A1 | 8/2013 | Yarbro et al. | |
| 2014/0028302 A1 * | 1/2014 | Wolf | G01N 27/9046 324/241 |
| 2015/0204648 A1 | 7/2015 | Nichols | |
| 2015/0260669 A1 | 9/2015 | Bittar et al. | |
| 2016/0084982 A1 | 3/2016 | Donderici | |

FOREIGN PATENT DOCUMENTS

| | | |
|---|---|---|
| WO | 2015047865 A1 | 4/2015 |
| WO | 2015157270 A1 | 10/2015 |

OTHER PUBLICATIONS

Al-Yateem, et al., Measuring and Profiling Casing Corrosion for Predicting Subsurface Leaks, IPTC 17170, 2013.
Brill, et al., Electromagnetic Casing Inspection Tool for Corrosion Evaluation, IPTC 14865, 2012.
Arbuzov et al., Memory Magnetic Imaging Defectoscopy, SPE 162054, 2012.
Garcia, et al., Successful Application of a New Electromagnetic Corrosion Tool for Well Integrity Evaluation in Old Wells Completed with Reduced Diameter Tubular, IPTC 16997, 2013.
Magnetic Thickness Tool, Company: GE Energy-GE, Tool: Sondex Wireline Tools-Cased Hole Products, 2003.
International Search Report and Written Opinion for PCT/US2015/037631 dated Sep. 21, 2015.
Extended European Search Report from European Patent Application No. 15819172.6, dated Feb. 13, 2018, 10 pages.

* cited by examiner

MULTIPLE-DEPTH EDDY CURRENT PIPE INSPECTION WITH A SINGLE COIL ANTENNA

CROSS-REFERENCE TO RELATED APPLICATIONS

The present application claims priority to U.S. patent application Ser. No. 14/890,004, filed on Nov. 9, 2015; which claims priority to PCT/US2015/037631 filed Jun. 25, 2015 and Provisional Patent Application No. 62/023,490, filed on Jul. 11, 2014.

BACKGROUND

Wellbores in the oil and gas industry are typically drilled using a drill string with a drill bit secured to its distal end. The drilled wellbore is subsequently completed by cementing a string of metal pipes connected end-to-end within the wellbore. Commonly called "casing," such strings of metal pipes increase the integrity of the wellbore and provide a flow path between the earth's surface and selected subterranean formations. Moreover, in some wellbores, one or more production pipes are extended into the wellbore to provide a conduit for hydrocarbons to be conveyed to the earth's surface. Accordingly, as used herein, the term "pipe" or "wellbore pipe" will refer to metal pipes or pipelines that line the walls of a wellbore, such as casing, and also production pipes extended into a wellbore to facilitate hydrocarbon production operations.

During the lifetime of a well, wellbore pipes are exposed to high volumes of materials and fluids required to pass through them, including chemically aggressive fluids. In harsh environments, however, the pipes may be subject to corrosion that may affect their functionality. Timely and accurate detection of structural integrity problems such as cracks, pinholes, and corrosion is essential to reducing costs associated with wellbore intervention, since pulling wellbore pipes, such as casing, out of a wellbore for further inspection and repairs and replacing can be a very expensive task.

Some wellbores include multiple concentric pipes or strings of casing secured within the wellbore with an innermost pipe that exhibits a relatively narrow diameter. As will be appreciated, the diameter of the innermost pipe limits the size of the monitoring and intervention system that can be deployed to monitor the integrity of all of the concentric pipes. With multiple concentric pipes, another problem is the ability to effectively monitor the outermost pipes from the innermost pipe, since any monitoring system has to be able to sense through a number of pipe layers, each of which may have developed distinct problems or defects.

Several different sensing methods have been proposed for detecting corrosion and other types of defects in pipelines, some of which have been applied to wellbore pipes used for extracting hydrocarbons. The most common method utilizes acoustic wave pulses and analysis of reflections from the surface of a pipe wall to image any defects. Electromagnetic inspection methods are also used for the same purpose, and are desirable since they allow an operator to sense beyond the first pipe, and thereby obtain measurements from second, third, or additional pipes beyond the third pipe. Existing pipe inspection methods, however, are either azimuthally sensitive and shallow or azimuthally insensitive and deep.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to maintenance of wellbores in the oil and gas industry and, more particularly, to monitoring and evaluating corrosion in wellbore pipes with a pipe inspection tool having a single coil antenna.

Embodiments described herein provide improved electromagnetic inspection methods of wellbore pipes, such as casings and production tubings. The presently described methods rely on multiple excitation points and multiple measurement points on the same coil winding of a coil antenna, which can achieve variable or selective depth of investigation. While existing eddy current inspection methods utilize z-coils that have multiple coil antennas for achieving different depths of investigation, the embodiments of the present disclosure use multiple terminals on a single coil antenna to achieve the same result. Exemplary characteristics of the wellbore pipes that may be measured include, but are not limited to, thickness, magnetic permeability, conductivity, and diameter. Such measurements may advantageously provide an operator with an indication of defects on the wellbore pipes. For example, a reduction in the thickness of a pipe can be interpreted as metal loss or corrosion.

Moreover, according to the present disclosure, in order to minimize cross-coupling between measurements without significantly reducing signal strength, a ferrite core about which the coil antenna is wound may be subdivided into multiple segments or portions. The resulting response signals with the segmented core can be decoupled using a special calibration on the measured current or voltage that can be calculated using a data acquisition and control system. In addition, a hardware or software control could be employed to adjust the currents to achieve independent measurements.

Figure 1:
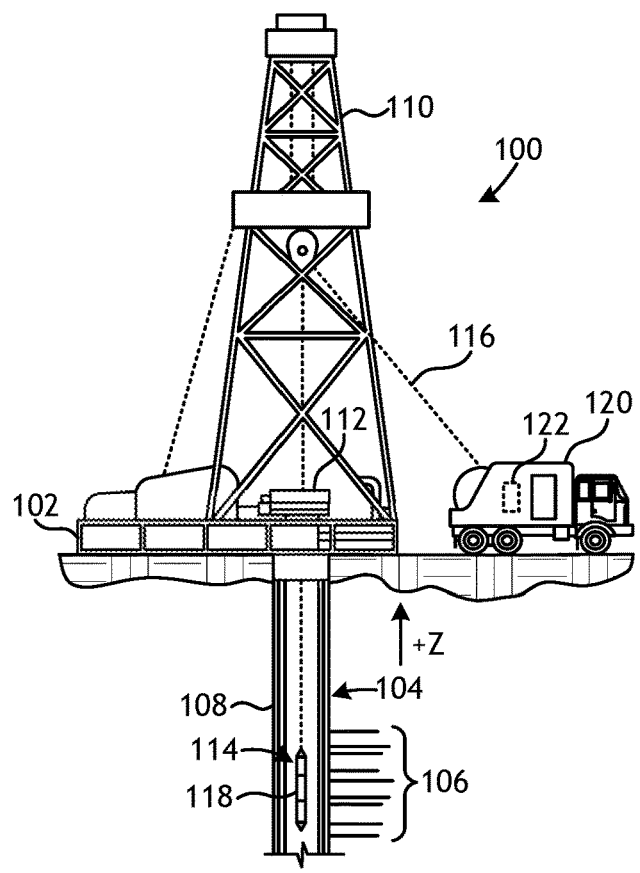
FIG. 1 is a schematic diagram of an exemplary wireline system that may employ the principles of the present disclosure.

FIG. 1 is a schematic diagram of an exemplary wireline system 100 that may employ the principles of the present disclosure, according to one or more embodiments. As illustrated, the wireline system 100 may include a surface platform 102 positioned at the earth's surface and a wellbore 104 that extends from the surface platform 102 into one or more subterranean formations 106. In other embodiments, such as in offshore operations, a volume of water may separate the surface platform 102 and the wellbore 104. The wellbore 104 may be lined with one or more pipes 108, also referred to as strings of casing. In some embodiments, portions of the wellbore 104 may have only one pipe 108 positioned therein, but other portions of the wellbore 104 may be lined with two or more concentrically-disposed pipes 108. The pipes 108 may be made of plain carbon steel, stainless steel, or another material capable of withstanding a variety of forces, such as collapse, burst, and tensile failure.

The wireline system 100 may include a derrick 110 supported by the surface platform 102 and a wellhead installation 112 positioned at the top of the wellbore 104. A pipe inspection tool 114 may be suspended into the wellbore 104 on a cable 116. In some embodiments, the pipe inspection tool 114 may alternatively be suspended within a production pipe (not shown) positioned within the pipes 108 that line the wellbore 104 (i.e., casing). In such embodiments, the production pipe may extend by itself within the pipes 108 or alternatively be positioned adjacent one or more eccentrically-located production pipes that are also positioned within the pipes 108. Accordingly, as used herein, "pipes 108" may refer to strings of casing that line the wellbore 104 and/or at least one production pipe extended into the wellbore 104.

The pipe inspection tool 114 may comprise an electromagnetic, non-destructive inspection tool. Its operation may be based on either the flux-leakage principle or the eddy-current principle, or a combination thereof, and may be insensitive to non-conductive deposits and is operable irrespective of the nature of the fluid mixture flowing into/out of the wellbore 104. The pipe inspection tool 114 can be used for the detection of localized damage or defects in the pipes 108. In operation, the pipes 108 are subjected to a strong static magnetic field generated by the pipe inspection tool 114 and, due to their ferromagnetic nature, the magnetic return flux is mainly confined to the inside of the pipes 108. In the presence of discontinuities or defects in the metal of the pipes 108, such as pits and holes caused by corrosion, the changes in the magnetic field can be detected with the pipe inspection tool 114.

To accomplish this, the pipe inspection tool 114 may include one or more electromagnetic sensors 118, which may be communicably coupled to the cable 116. The cable 116 may include conductors for conveying power to the pipe inspection tool 114 and also for facilitating communication between the surface platform 102 and the pipe inspection tool 114. A logging facility 120, shown in FIG. 1 as a truck, may collect measurements from the electromagnetic sensors 118, and may include computing facilities 122 for controlling, processing, storing, and/or visualizing the measurements gathered by the electromagnetic sensors 118. The computing facilities 122 may be communicably coupled to the pipe inspection tool 114 by way of the cable 116.

The electromagnetic sensors 118 may include one or more electromagnetic coil antennas that may be used as transmitters, receivers, or a combination of both (i.e., transceivers) for obtaining in situ measurements of the pipe(s) 108 and thereby determining the structural integrity or condition of each pipe 108. Multiple measurements may be made by the electromagnetic sensors 118 as the pipe inspection tool 114 is lowered into the wellbore 104 (i.e., "down log") and/or raised back to the surface of the well (i.e., "up log"). Each measurement gives an indication of the condition of the pipes 108 at the specific depth where the pipe inspection tool 114 is located.

The principle of measurement is based on two separate mechanisms: magnetic fields that follow the magnetically shortest path (such as in magnetic circuits) and eddy currents that are induced on the pipes 108, which create signals as a function of the electromagnetic skin depth of the pipes 108. Received signals are also affected by casing collars and natural changes in the magnetic properties of different pieces of a wellbore pipe. After received signals are recorded, they are interpreted by an algorithm, and features of the pipes 108 can be calculated from the measurements. These calculations and determinations can be undertaken, for example, using the computing facilities 122 at the logging facility 120. Advantageously, electromagnetic inspection tools, such as the pipe inspection tool 114, provide a capability to make measurements of the pipes 108 beyond the first or innermost wellbore pipe.

In some embodiments, the electromagnetic sensors 118 may be designed to operate in a centralized position within the innermost pipe 108, such as through the use of one or more centralizers (not shown) attached to the body of the pipe inspection tool 114. In other embodiments, however, the electromagnetic sensors 118 may be designed to be adjacent or in intimate contact with the inner wall of the innermost pipe 108. In such embodiments, the electromagnetic sensors 118 may be mounted on one or more deployable sensor pads (not shown) positioned on actuatable arms (not shown) that move the electromagnetic sensors 118 radially outward toward the inner wall of the innermost pipe 108.

Figure 2:
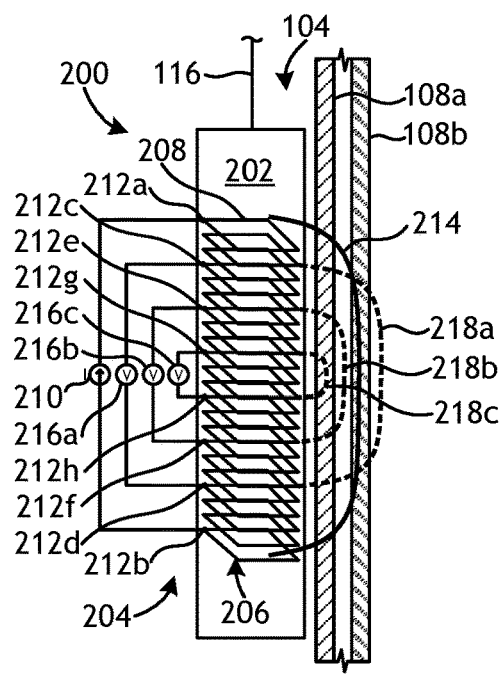
FIG. 2 is a partial cross-sectional side view of an exemplary pipe inspection tool suspended within a wellbore.

FIG. 2 is a partial cross-sectional side view of an exemplary pipe inspection tool 200 suspended within the wellbore 104, according to one or more embodiments of the present disclosure. For simplicity, only one side or half of the wellbore 104 is shown in FIG. 2. The pipe inspection tool 200 may be the same as or similar to the pipe inspection tool 114 of FIG. 1 and, therefore, may be used to monitor the pipes 108 positioned within the wellbore 104. In the illustrated embodiment, the pipes 108 are shown as a first pipe 108a and a second pipe 108b, where the first pipe 108a is the innermost wellbore pipe and/or concentrically-located within the second pipe 108b. In some embodiments, the first and second pipes 108a,b may line the walls of the wellbore 104 as concentric strings of casing. In other embodiments, however, the first pipe 108a may comprise a production pipe concentrically- or eccentrically-positioned within the second pipe 108b, which may comprise casing that lines the wellbore 104, without departing from the scope of the disclosure. As will be appreciated, more than two pipes 108a,b may be used in any of the embodiments described herein.

As illustrated, the pipe inspection tool 200 includes a body 202 and at least one electromagnetic sensor 204 positioned within or otherwise attached to the body 202. The electromagnetic sensor 204 may be similar to or the same as the electromagnetic sensor 118 of FIG. 1. As illustrated, the electromagnetic sensor 204 may include a coil antenna 206 that has at least one coil winding 208 extending axially along at least a portion of the length of the electromagnetic sensor 204. While not expressly shown in FIG. 2, the coil antenna 206 may further include a core, and the coil winding 208 may be wrapped about the core. As described in more detail below, the core may be made of a magnetically-permeable material and may help amplify or boost electromagnetic signals emitted by the electromagnetic sensor 204. In some embodiments, the core may comprise a solid, elongate rod. In other embodiments, however, the core may be segmented or laminated into several axial lengths.

In the illustrated embodiment, the coil winding 208 is depicted as multiple closed (i.e., disconnected) loops for illustration purposes only and, therefore, should not be considered as limiting the present disclosure. Rather, the coil winding 208 will typically exhibit a continuous solenoid or helical winding pattern that extends between the axial upper and lower ends of the coil antenna 206. Moreover, while depicted in FIG. 2 as exhibiting a generally square or rectangular shape or profile, the coil winding 208 of the coil antenna 206 may alternatively exhibit a circular or elliptical shape, without departing from the scope of the disclosure.

In the illustrated embodiment, the coil winding 208 is coupled to a power source 210 (e.g., an alternating current) at a first terminal 212a and a second terminal 212b. The power source 210 may be characterized as a transmitter-side amplifier, and the first and second terminals 212a,b may alternatively be referred to as first and second "ports," respectively, that are electrically connected to the input/output of the transmitter-side amplifier. When excited by the power source 210, such as through the influx of an alternating current or a voltage, the coil antenna 206 generates a magnetic field 214 that extends radially away from the pipe inspection tool 200 and penetrates at least one of the pipes 108a,b.

The electromagnetic sensor 204 may further include one or more receivers 216 electrically connected to the coil antenna 206 at various axial locations along the coil winding 208. The receivers 216 are depicted in FIG. 2 as a first receiver 216a, a second receiver 216b, and a third receiver 216c. The first receiver 216a may be electrically coupled to the coil winding 208 at third and fourth terminals 212c and 212d, the second receiver 216b may be electrically coupled to the coil winding 208 at fifth and sixth terminals 212e and 212f, and the third receiver 216c may be electrically coupled to the coil winding 208 at seventh and eighth terminals 212g and 212h. As illustrated, the seventh and eighth terminals 212g,h axially interpose the fifth and sixth terminals 212e,f, the fifth and sixth terminals 212e,f axially interpose the third and fourth terminals 212c,d, and the third and fourth terminals 212c,d axially interpose the first and second terminals 212a,b. As a result, the first receiver 216a may exhibit a first magnetic sensitivity 218a, the second receiver 216b may exhibit a second magnetic sensitivity 218b, and the third receiver 216c may exhibit a third magnetic sensitivity 218c, where the first magnetic sensitivity 218a extends radially deeper than the second magnetic sensitivity 218b, and the second magnetic sensitivity 218c extends radially deeper than the third magnetic sensitivity 218c.

Since the radial depth of investigation is proportional to the size (i.e., effective axial length) of the receiver 216a-c, each measurement obtained by the receivers 216a-c will be influenced differently by different pipes 108a,b. Such diverse information allows for accurate interpretation of multiple features of the pipes 108a,b, such as any defects or corrosion that may be present on the pipes 108a,b. While three receivers 216a-c are depicted in FIG. 2, it will be appreciated that more or less than three receivers 216a-c may be employed in the electromagnetic sensor 204, without departing from the scope of the disclosure.

Figure 3:
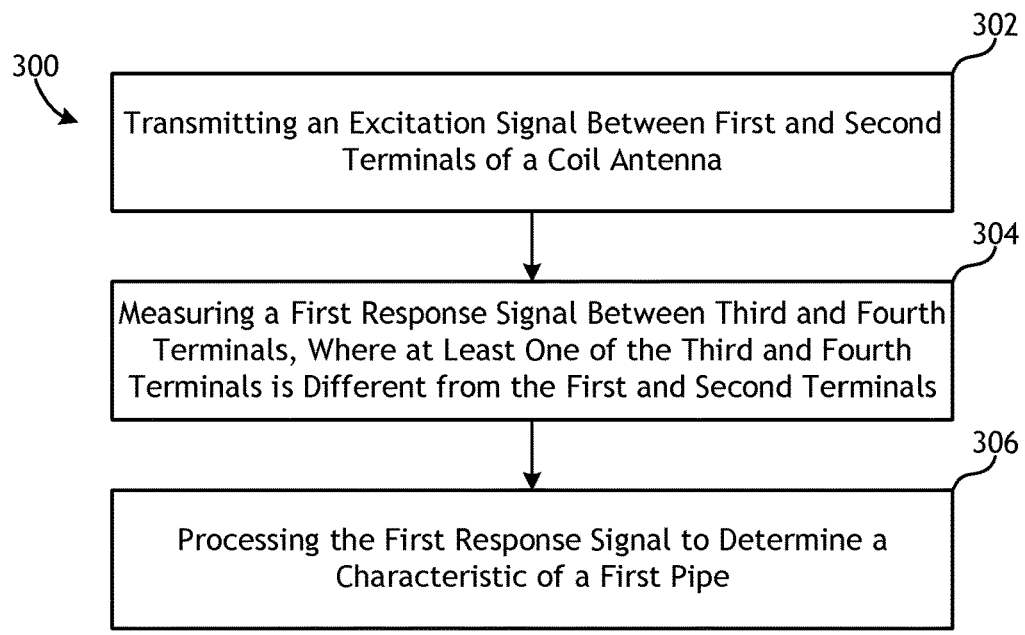
FIG. 3 is a schematic flowchart of an exemplary method of operating the electromagnetic sensor of FIG. 2.

FIG. 3 is a schematic flowchart of an exemplary method 300 of operating the electromagnetic sensor 200 of FIG. 2, according to one or more embodiments. According to the method 300, an excitation signal may be transmitted between first and second terminals of a coil antenna, as at 302. The excitation signal may be a time-domain or frequency-domain (steady-state) signal generated by the power source 210 and conveyed through the coil antenna 206 between the first and second terminals 212a,b. The excitation signal may result in the generation of the magnetic field 214.

A first response signal may then be measured between third and fourth terminals of the coil antenna, where at least one of the third and fourth terminals is different from the first and second terminals, as at 304. The first response signal may be received and measured by any of the receivers 216a-c described above. In at least one embodiment, one of the receivers 216a-c may share a terminal with the power source 210. The first response signal may then be processed to determine a characteristic of a first pipe positioned in a wellbore, as at 306. Example characteristics of the first pipe that may be determined include, but are not limited to, the dimensions (i.e., diameter, wall thickness, etc.) of the first pipe, the presence of a defect (e.g., corrosion, fractures, holes, and decreased wall thickness) in the first pipe, and/or the presence of a conductive or magnetically-permeable feature in the first pipe.

In some embodiments, the first response signal may be conveyed to the logging facility 120 (FIG. 1) and the associated computing facilities 122 (FIG. 1) for processing via the cable 116 (FIG. 1). The first pipe of 306 may refer to either the first or second pipes 108a,b of FIG. 2, and may depend on the axial distance between the third and fourth terminals of 304. The first pipe 108a, for instance, may be monitored with a shorter axial distance between the third and fourth terminals, and the second pipe 108b may be monitored with a longer axial distance between the third and fourth terminals.

Figure 4:
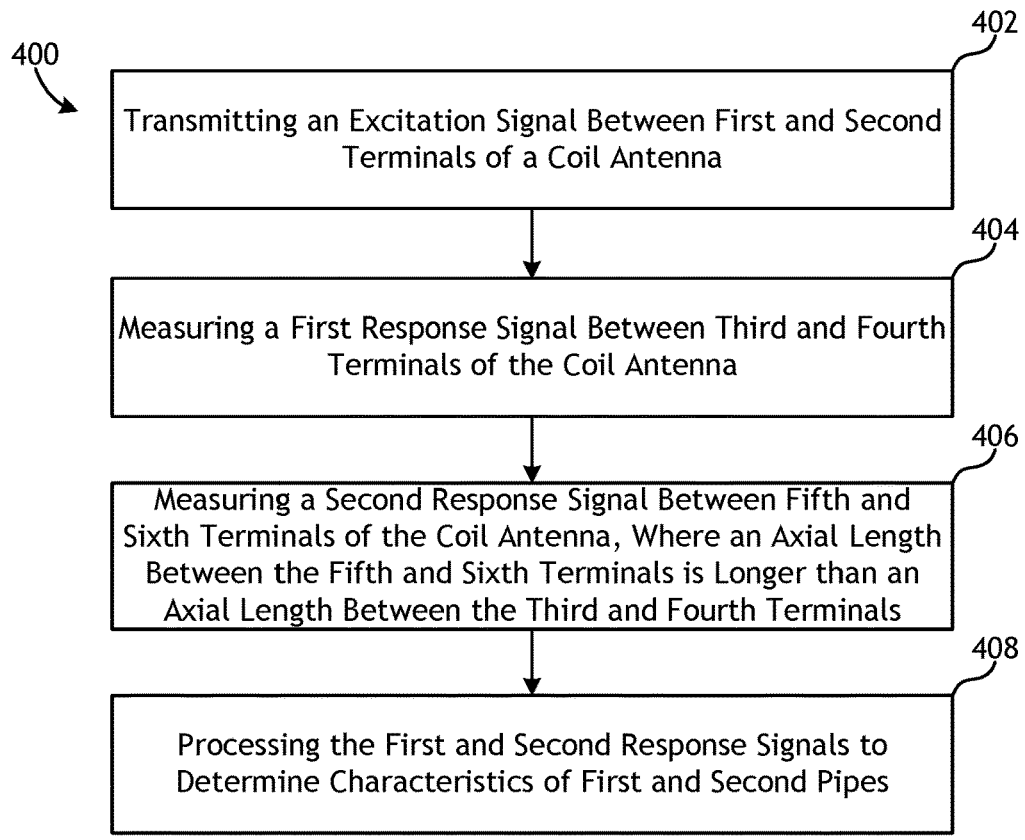
FIG. 4 is a schematic flowchart of another exemplary method of operating the electromagnetic sensor of FIG. 2.

FIG. 4 is a schematic flowchart of another exemplary method 400 of operating the electromagnetic sensor 200 of FIG. 2, according to one or more embodiments. According to the method 400, an excitation signal may be transmitted between first and second terminals of a coil antenna, as at 402. Again, the excitation signal may be a time-domain or frequency-domain (steady-state) signal generated by the power source 210 and conveyed through the coil antenna 206 between the first and second terminals 212a,b, and the excitation signal may result in the generation of the magnetic field 214.

A first response signal may then be measured between third and fourth terminals of the coil antenna, as at 404, and a second response signal may be measured between fifth and sixth terminals of the coil antenna, as at 406, where an axial length of the coil antenna between the fifth and sixth terminals is longer than an axial length of the coil antenna between the third and fourth terminals. In some embodiments, for example, the first response signal may be received by the second or third receivers 216b,c (FIG. 2) via the fifth and sixth terminals 212e,f (FIG. 2) or the seventh and eighth terminals 212g,h (FIG. 2), respectively, and the second response signal may be received by the first or second receivers 216a,b (FIG. 2) via the third and fourth terminals 212c,d (FIG. 2) or the fifth and sixth terminals 212e,f (FIG. 2), respectively. In at least one embodiment, the first response signal is received by the third receiver 216c via the seventh and eighth terminals 212g,h, and the second response signal is received by the first receiver 216a the third and fourth terminals 212c,d.

The first and second response signals may then be processed to determine characteristics of first and second pipes positioned in a wellbore, as at 408. The first and second pipes of 408 may refer to the first and second pipes 108a,b of FIG. 2. Example characteristics of the first and second pipes 108a,b that may be determined include, but are not limited to, the dimensions (i.e., diameter, wall thickness, etc.) of the pipes 108a,b, the presence of a defect (e.g., corrosion, fractures, holes, and decreased wall thickness) in the pipes 108a,b, and/or the presence of a conductive or magnetically-permeable feature in the pipes 108a,b. In some embodiments, the first and second response signals may be conveyed to the logging facility 120 (FIG. 1) and the associated computing facilities 122 (FIG. 1) for processing via the cable 116 (FIG. 1).

Figure 5:
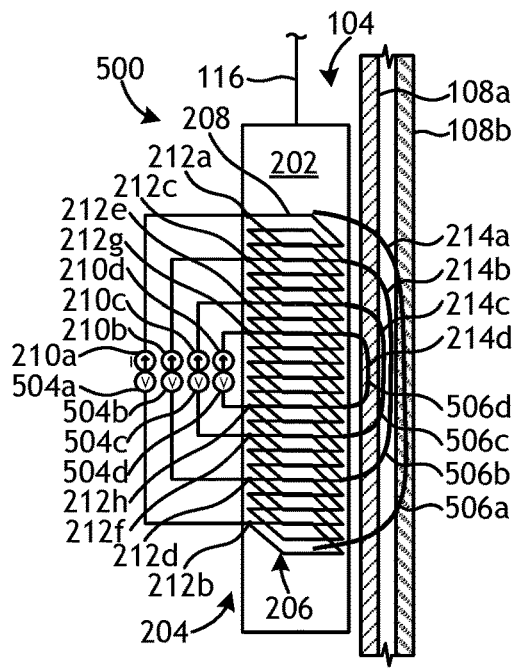
FIG. 5 is a partial cross-sectional side view of another exemplary pipe inspection tool suspended within a wellbore.

FIG. 5 is a partial cross-sectional side view of another exemplary pipe inspection tool 500 suspended within the wellbore 104, according to one or more embodiments of the present disclosure. For simplicity, only one side or half of the wellbore 104 is shown in FIG. 5. The pipe inspection tool 500 may be similar in some respects to the pipe inspection tool 200 of FIG. 2 and therefore may be best understood with reference thereto, where like numerals represent like elements or components not described again in detail. Similar to the pipe inspection tool 200, the pipe inspection tool 500 may be used to monitor the pipes 108a,b positioned within the wellbore 104. Moreover, similar to the pipe inspection tool 200, the pipe inspection tool 500 includes the electromagnetic sensor 204 positioned within the body 202.

In the illustrated embodiment, the coil winding 208 of the coil antenna 206 is electrically coupled to multiple power sources 210 at multiple terminals 212. More particularly, a first power source 210a is coupled to the coil winding 208 at the first and second terminals 212a,b, a second power source 210b is coupled to the coil winding 208 at the third and fourth terminals 212c,d, a third power source 210c is coupled to the coil winding 208 at the fifth and sixth terminals 212e,f, and a fourth power source 210d is coupled to the coil winding 208 at the seventh and eighth terminals 212g,h. When excited by the power sources 210a-d, the coil antenna 206 generates magnetic fields 214a, 214b, 214c, and 214d, respectively, that extend radially away from the pipe inspection tool 500 and penetrate at least one of the pipes 108a,b.

The electromagnetic sensor 204 of FIG. 5 may further include a plurality of receivers 504 electrically connected to the coil antenna 206 at various axial locations along the coil winding 208. The receivers, shown as first, second, third, and fourth receivers 504a, 504b, 504c, and 504d, respectively, may be similar to the receivers 210a-c of FIG. 2. As illustrated, the first receiver 504a may be electrically coupled to the coil winding 208 at the first and second terminals 212a,b, the second receiver 504b may be electrically coupled to the coil winding 208 at the third and fourth terminals 212c,d, the third receiver 504c may be electrically coupled to the coil winding 208 at the fifth and sixth terminals 212e,f, and the fourth receiver 504d may be electrically coupled to the coil winding 208 at the seventh and eighth terminals 212g,h. Accordingly, the first receiver 504a may exhibit a first magnetic sensitivity 506a, the second receiver 504b may exhibit a second magnetic sensitivity 506b, the third receiver 504c may exhibit a third magnetic sensitivity 506c, and the fourth receiver 504d may exhibit a fourth magnetic sensitivity 506d. The first magnetic sensitivity 506a extends radially deeper than the second magnetic sensitivity 506b, the second magnetic sensitivity 506b extends radially deeper than the third magnetic sensitivity 506c, and the third magnetic sensitivity 506c extends radially deeper than the fourth magnetic sensitivity 506d.

Accordingly, the excitation signals of the power sources 210a-d may be applied at different terminals 212a-h of the coil winding 208, which are also used for detecting response signals obtained by the receivers 504a-d. In some embodiments, the excitation signals may be applied simultaneously and at the same frequency. In other embodiments, however, the excitation signals may be applied at different frequencies. Moreover, the excitation signals may be applied at different times, without departing from the scope of the disclosure.

Multiple measurements with different excitations may be made by implementing a frequency or time-multiplexing method. In general, a combination of all N excitation signals and N receivers produces a total of $N^2$ measurements, all of which can be used in determining characteristics of the pipes 108a,b. Similar to the pipe inspection tool 200 of FIG. 2, the pipe inspection tool 500 may be able to generate multiple depths of investigation and thereby allow multi-pipe 108a,b interpretation. However, due to availability of excitations with smaller spacing, which exhibits smaller sensitivity volumes, the embodiment of FIG. 5 may be capable of producing much smaller depths of investigation. As will be appreciated, this may allow a broader range of interpretation and may, therefore, result in more accuracy in interpretation of radially shallow features, such as those associated with the first pipe 108a.

Figure 6:
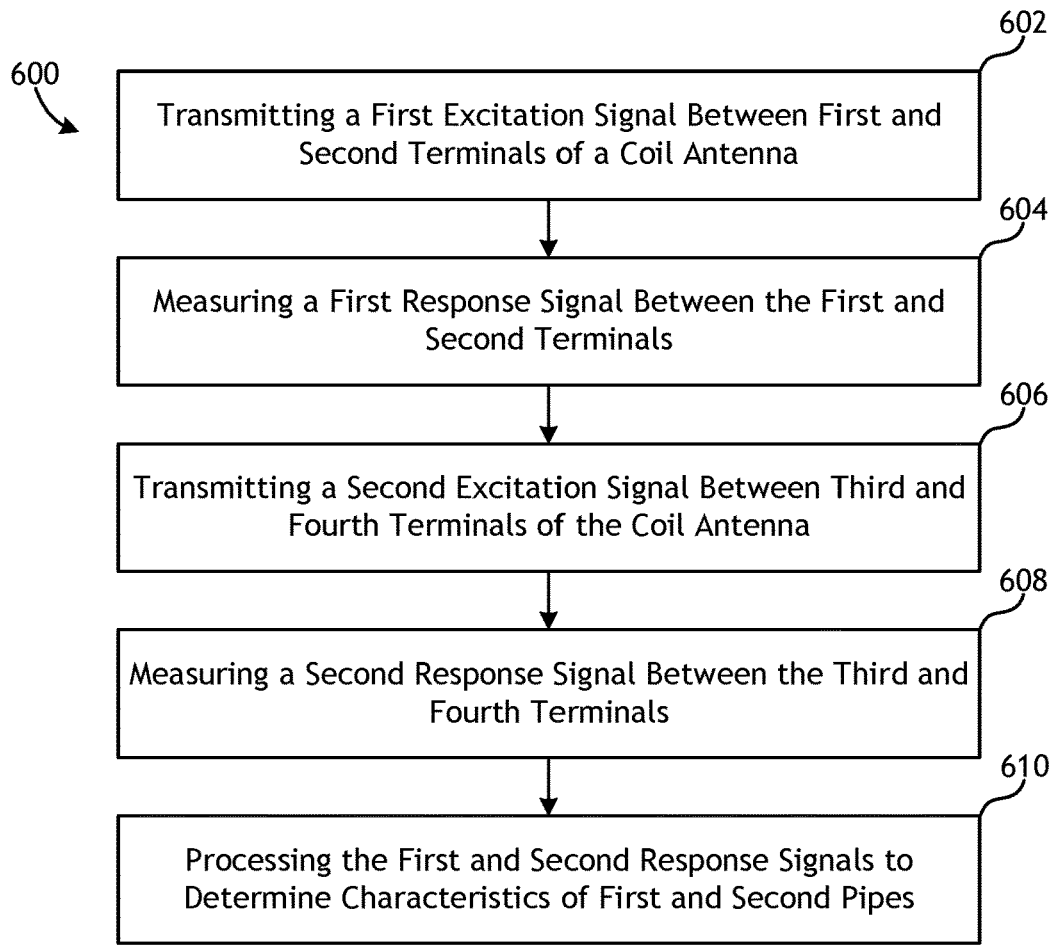
FIG. 6 is a schematic flowchart of an exemplary method of operating the electromagnetic sensor of FIG. 5.

FIG. 6 is a schematic flowchart of an exemplary method 600 of operating the electromagnetic sensor 500 of FIG. 5, according to one or more embodiments. According to the method 600, a first excitation signal may be transmitted between first and second terminals of a coil antenna, as at 602. The first excitation signal may be a time-domain or frequency-domain (steady-state) signal generated by any of the power sources 210a-d and conveyed through the coil antenna 206 between a corresponding pair of the electrically-coupled terminals 212a-h. The first excitation signal may result in the generation of a corresponding magnetic field 214a-d. A first response signal may then be measured between the first and second terminals, as at 604.

The method 600 may then proceed by transmitting a second excitation signal between third and fourth terminals of the coil antenna, as at 606, where the third and fourth terminals are different from the first and second terminals. Similar to the first excitation signal, the second excitation signal may be a time-domain or frequency-domain (steady-state) signal generated by any of the power sources 210a-d, excepting the power source 210a-d used to generate the first excitation signal, and conveyed through the coil antenna 206 between a corresponding pair of the electrically-coupled terminals 212a-h, but different from the pair of the terminals 212a-h used for the first excitation signal. Moreover, the second excitation signal may result in the generation of a corresponding magnetic field 214a-d (excepting the magnetic field 214a-d generated by the first excitation signal). A second response signal may then be measured between the third and fourth terminals, as at 608.

In at least one embodiment, the first excitation signal is generated by the first power source 210a and transmitted between the first and second terminals 212a,b of the coil antenna 206, and the first response signal is then measured by the first receiver 504a at the first and second terminals 212a,b. In such embodiments, the second excitation signal may be generated by any of the second, third, or fourth power sources 210b-d and transmitted between the any corresponding pair of terminals 212c-h of the coil antenna 206, and the second response signal is then measured by the corresponding second, third, or fourth receiver 504c-d. It will be appreciated, however, that several different scenarios or configurations of operating the electromagnetic sensor 500 in accordance with steps 602-608 may be had, without departing from the scope of the disclosure.

The first and second response signals may then be processed to determine characteristics of first and second pipes positioned in a wellbore, as at 610. The first and second pipes of 610 may refer to the first and second pipes 108a,b of FIG. 5, and the characteristics of the first and second pipes 108a,b that may be determined are as mentioned above. Moreover, in some embodiments, the first and second response signals may be conveyed to the logging facility 120 (FIG. 1) and the associated computing facilities 122 (FIG. 1) for processing via the cable 116 (FIG. 1).

Figure 7:
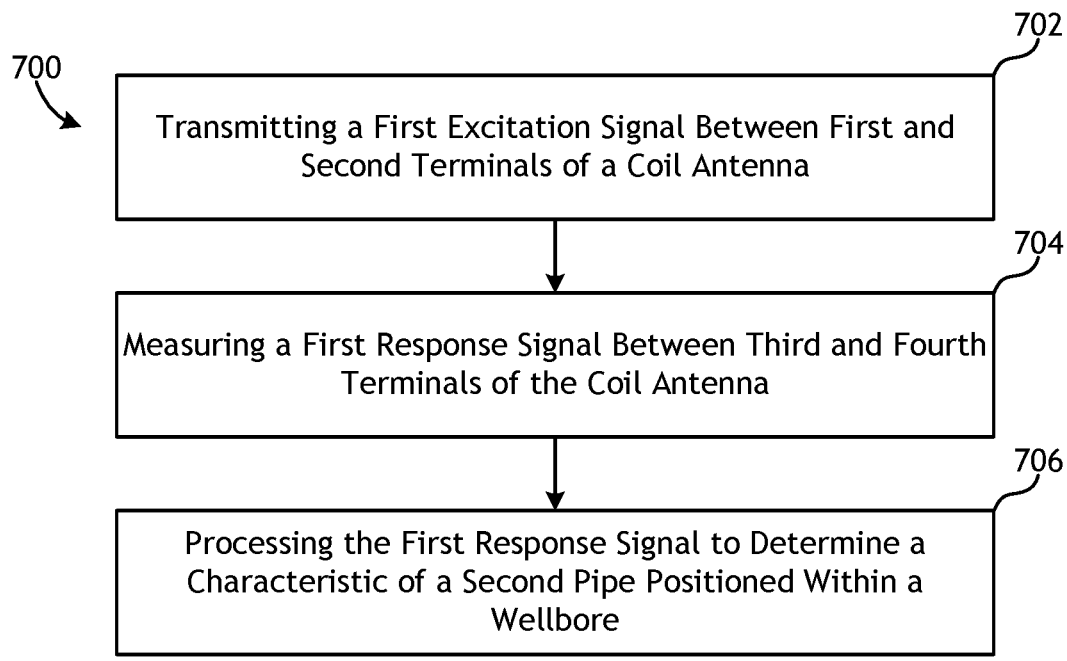
FIG. 7 is a schematic flowchart of another exemplary method of operating the electromagnetic sensor of FIG. 5.

FIG. 7 is a schematic flowchart of another exemplary method 700 of operating the electromagnetic sensor 500 of FIG. 5, according to one or more embodiments. According to the method 700, a first excitation signal is transmitted between first and second terminals of a coil antenna, as at 702. The first excitation signal may be a time-domain or frequency-domain (steady-state) signal generated by any of the power sources 210a-d and conveyed through the coil antenna 206 between a corresponding pair of the electrically-coupled terminals 212a-h. The first excitation signal may result in the generation of a corresponding magnetic field 214a-d.

A first response signal is then measured between third and fourth terminals of the coil antenna, where an axial length of the coil antenna between the third and fourth terminals is longer than an axial length of the coil antenna between the first and second terminals, as at 704. Based on electromagnetic reciprocity, this embodiment may produce substantially the same result as the embodiment of the method 600 where first and third terminals are switched, and the second and fourth terminals are switched (or otherwise the role of excitation and reception is switched). However, the impedance loading of embodiments will be different from each other since portions of the coil antenna that are driven with excitation may be different. As a result, this method 700 may be preferred as compared to the method 600 based on electrical design considerations.

The first response signal may then be processed to determine a characteristic of a second pipe positioned in a wellbore, as at 706, where the second pipe is concentrically-positioned about a first pipe positioned within the wellbore. The second pipe of 306 may refer to second pipe 108b of FIG. 5, and example characteristics of the second pipe that may be determined include, but are not limited to, the dimensions (i.e., diameter, wall thickness, etc.) of the second pipe, the presence of a defect (e.g., corrosion, fractures, holes, and decreased wall thickness) in the second pipe, and/or the presence of a conductive or magnetically-permeable feature in the second pipe. In some embodiments, the first response signal may be conveyed to the logging facility 120 (FIG. 1) and the associated computing facilities 122 (FIG. 1) for processing via the cable 116 (FIG. 1).

Figure 8:
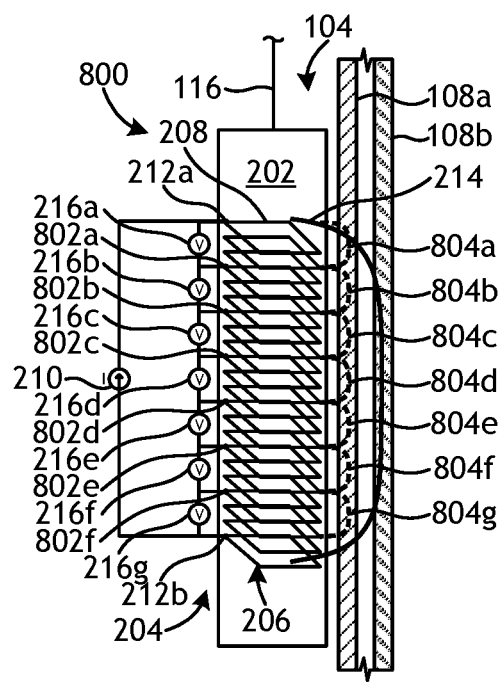
FIG. 8 is a partial cross-sectional side view of another exemplary pipe inspection tool suspended within a wellbore.

Referring now to FIG. 8, illustrated is a partial cross-sectional side view of another exemplary pipe inspection tool 800 suspended within the wellbore 104, according to one or more embodiments of the present disclosure. For simplicity, only one side or half of the wellbore 104 is shown in FIG. 8. The pipe inspection tool 800 may be similar in some respects to the pipe inspection tools 200 and 500 of FIGS. 2 and 5, respectively, and therefore may be best understood with reference thereto, where like numerals represent like elements or components not described again in detail. Similar to the pipe inspection tools 200 and 500, for instance, the pipe inspection tool 800 may be used to monitor the pipes 108a,b positioned within the wellbore 104. Moreover, the pipe inspection tool 800 includes the electromagnetic sensor 204 positioned within the body 202.

As illustrated, the coil winding 208 of the coil antenna 206 is electrically coupled to the power source 210 at the first and second terminals 212a,b located at opposing axial ends of the coil winding 208. When excited by the power source 210, the coil antenna 206 generates the magnetic field 214 that extends radially away from the pipe inspection tool 200 and penetrates at least one of the pipes 108a,b.

The electromagnetic sensor 204 may further include a plurality of receivers 216 electrically connected to the coil antenna 206 at various axial locations along the coil winding 208. More particularly, the electromagnetic sensor 204 may include receivers 216a, 216b, 216c, 216d, 216e, 216f, and 216g, each being electrically coupled to each other and also to the coil winding 208 at a plurality of terminals 802, shown as terminals 802a, 802b, 802c, 802d, 802e, and 802f. Since the radial depth of investigation is proportional to the size (i.e., length) of the receiver 216a-g, the short axial distances along the coil antenna 206 between adjacent terminals 212a, 802a-f, and 212b results in the receivers 216a-g exhibiting corresponding shallow magnetic sensitivities 804, shown as magnetic sensitivities 804a, 804b, 804c, 804d, 804e, 804f, and 804g.

Although each of the measurements derived from the receivers 216a-g may have shallow (low) depth of investigation, it is possible to consider summation of different measurements to synthesize measurement between any combinations of the terminals 212a, 802a-f, and 212b. As an example, summation of all the measurements depicted in FIG. 8 may provide the result of an equivalent measurement at the first and second terminals 212a,b. As another example, summation of the three measurements provided at the center of the coil antenna 206 may produce the results of a single measurement between the uppermost terminals 212a and 802a-c and the lowermost terminals 802d-f and 212b that belong to the three measurements obtained by the receivers 216c-e located at the center. As will be appreciated, this may allow synthesis of any depth of investigation as required or desired.

Figure 9:
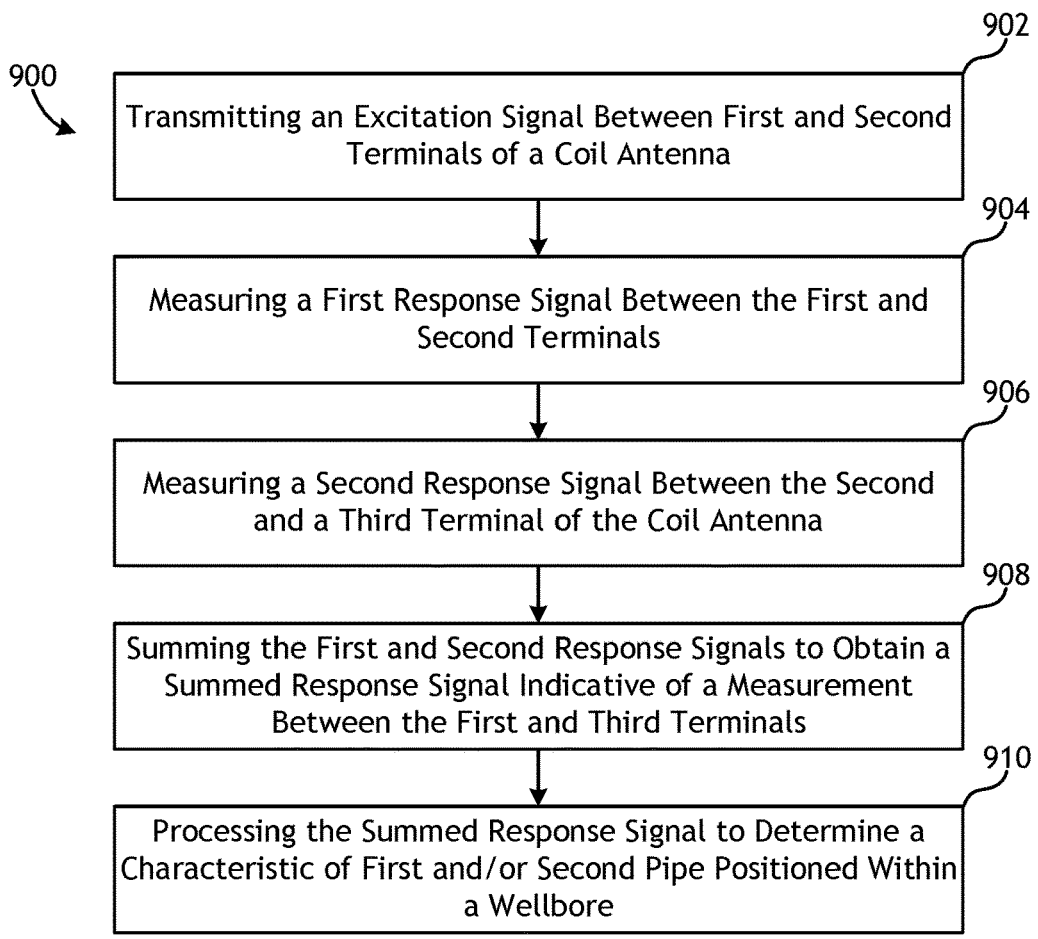
FIG. 9 is a schematic flowchart of an exemplary method of operating the electromagnetic sensor of FIG. 8.

FIG. 9 is a schematic flowchart of an exemplary method 900 of operating the electromagnetic sensor 800 of FIG. 8, according to one or more embodiments. According to the method 900, an excitation signal may be transmitted between first and second terminals of a coil antenna, as at 902. The excitation signal may be a time-domain or frequency-domain (steady-state) signal generated by the power source 210 (FIG. 8) and conveyed through the coil antenna 206 between the first and second terminals 212a,b, and the excitation signal may result in the generation of the magnetic field 214 (FIG. 8).

A first response signal may then be measured between the first and second terminals, as at 904, and a second response signal may be measured between the second and a third terminal of the coil antenna, as at 906. In the embodiment of FIG. 8, for example, the first response signal may be measured between the first and second terminals 212a,b and the second response signal may be measured between the second terminal 212b and any of the remaining terminals 802a-f.

The method 900 may then proceed by summing the first and second response signals to obtain a summed response signal that is indicative of a measurement between first and third terminals, as at 908. The summed response signal may then be processed to determine a characteristic of first and/or second pipes positioned in a wellbore, as at 910. As with prior embodiments, the first and second pipes of 910 may refer to the first and second pipes 108a,b of FIG. 8, and the characteristics of the first and second pipes 108a,b that may be determined are as mentioned above. Moreover, in some embodiments, the first and second response signals may be conveyed to the logging facility 120 (FIG. 1) and the associated computing facilities 122 (FIG. 1) for processing via the cable 116 (FIG. 1).

Figure 10:
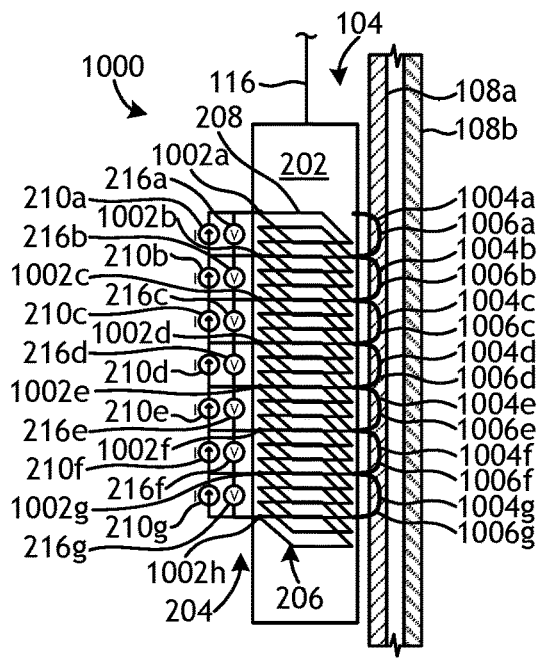
FIG. 10 is a partial cross-sectional side view of another exemplary pipe inspection tool suspended within a wellbore.

FIG. 10 is a partial cross-sectional side view of another exemplary pipe inspection tool 1000 suspended within the wellbore 104, according to one or more embodiments of the present disclosure. For simplicity, only one side or half of the wellbore 104 is shown in FIG. 10. The pipe inspection tool 1000 may be similar in some respects to the pipe inspection tools 200, 500, and 800 of FIGS. 2, 5, and 8, respectively, and therefore may be best understood with reference thereto, where like numerals represent like elements or components not described again in detail. Similar to the pipe inspection tools 200, 500, 800, for instance, the pipe inspection tool 1000 may be used to monitor the pipes 108a,b positioned within the wellbore 104. Moreover, the pipe inspection tool 1000 includes the electromagnetic sensor 204 positioned within the body 202.

As illustrated, the coil winding 208 of the coil antenna 206 is electrically coupled to multiple power sources 210a-g at multiple terminals 1002a-h, where the power sources 210a-g are coupled in series to each of the terminals 1002a-h. Upon excitation by the various power sources 210a-g, the coil antenna 206 may generate corresponding magnetic fields 1004a-g.

The electromagnetic sensor 204 may further include a plurality of receivers 216 electrically connected to the coil antenna 206 at various axial locations along the coil winding 208. More particularly, the electromagnetic sensor 204 may include receivers 216a-g each being electrically coupled in series to each other and also to the coil winding 208 at the plurality of terminals 1002a-h. Since the radial depth of investigation is proportional to the size (i.e., length) of the receiver 216a-g, the short axial distances along the coil antenna 206 between adjacent terminals 1002a-h results in the receivers 216a-g exhibiting corresponding shallow magnetic sensitivities 1006a-g.

Accordingly, the pipe inspection tool 1000 may be configured to conduct excitations and measurements at each of the terminals 1002a-h. In this configuration, any combination of measurements is possible between any of the power sources 210a-g and receivers 216a-g. It is also possible synthesize a measurement from any combination of exciter terminals 1002a-h to any combination of receiver terminals 1002a-h by summing different power source 210a-g and different receiver 216a-g measurements accordingly.

As an example, summation of all combination of N power source 210 measurements and N receiver 216 measurements (a total of $N^2$) would produce a measurement that is equivalent to a measurement where excitation is applied between the axial end points of the coil antenna 206, and receiving terminals 1002a-h are also placed at the axial end points of the coil antenna 206. It is noted that when multiple depth measurements are considered, not all measurements will be unique, since some measurements are simply a depth-shifted version of other measurements.

Figure 11:
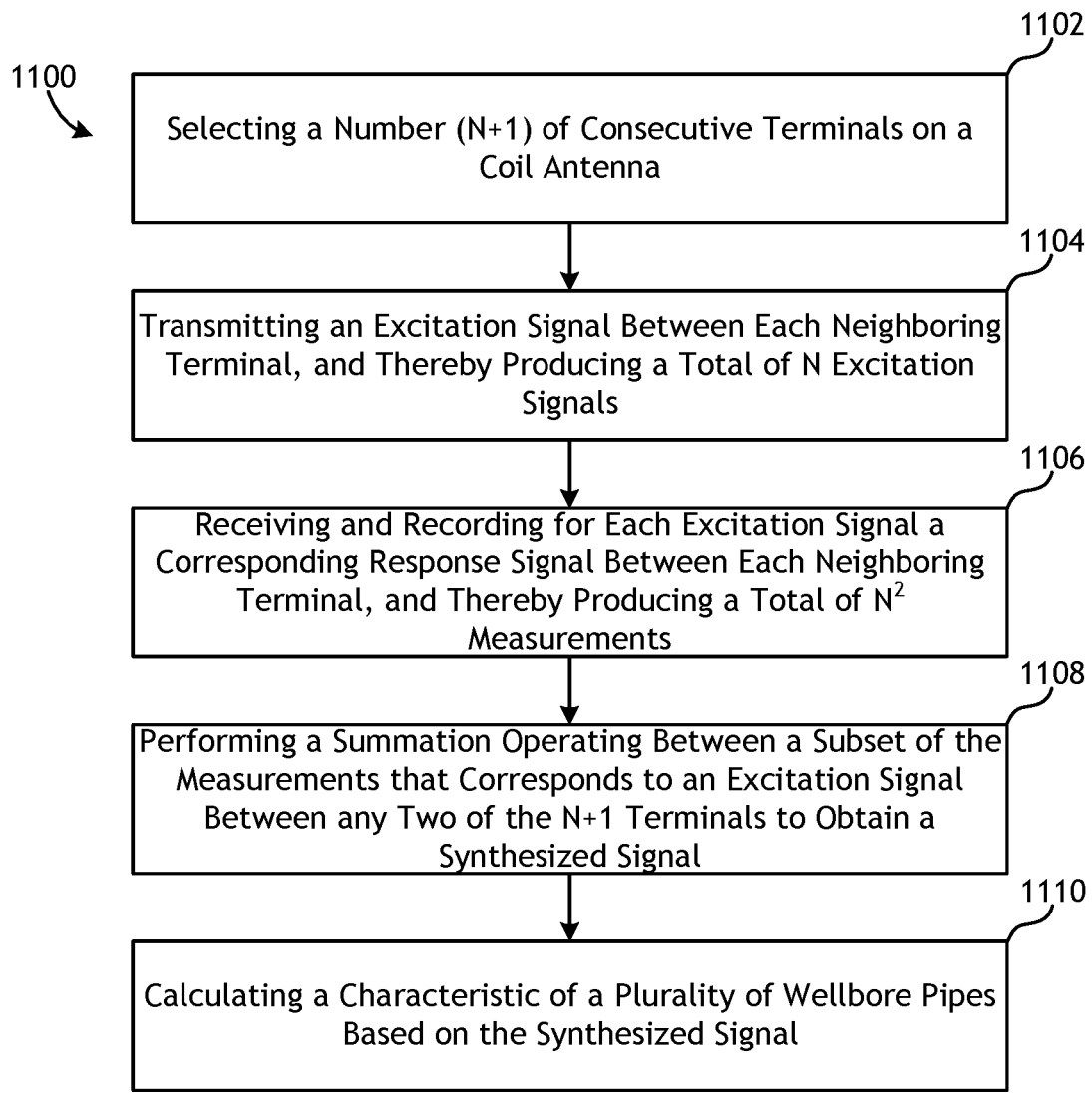
FIG. 11 is a schematic flowchart of an exemplary method of operating the electromagnetic sensor of FIG. 10.

Referring now to FIG. 11, illustrated is a schematic flowchart of an exemplary method 1100 of operating the electromagnetic sensor 1000 of FIG. 10, according to one or more embodiments. According to the method 1000, a number (i.e., N+1) of consecutive terminals are selected on a coil antenna, as at 1102. An excitation signal is then transmitted between each neighboring terminal, and thereby producing a total of N excitation signals, as at 1104. For each excitation signal, a corresponding response signal is received and recorded between each neighboring terminal, and thereby producing a total of $N^2$ measurements, as at 1106. Next, a summation operation is performed between a subset of the measurements that corresponds to an excitation signal between any two of the N+1 terminals, and response signal reception between any two of the N+1 terminals to obtain a synthesized signal, as at 1108. Finally, the synthesized signal is used in the calculation of a characteristic of a plurality of wellbore pipes, as at 1110. In a more general case, the synthesized signal can be generated by using weighted averages of multiple receiver signals measured at multiple pairs of receivers, with weight 1 equivalent to a sum, weight −1 equivalent to a subtraction, and any other weight possible depending on the convenience in processing the data.

In any one of the exemplary pipe inspection tools 200, 500, 800, 1000 of FIGS. 2, 5, 8, and 10, respectively, described herein, it may be possible to combine the measured responses (i.e., voltages) to obtain voltage differences. The voltage differences are useful because they may provide more information about the local defects in the wellbore pipes 108a,b. This is particularly the case in scenarios where the combined receiver voltages correspond to receivers that are symmetrically disposed with respect to the active transmitter.

To describe this concept more clearly, reference is again made to the pipe inspection tool of FIG. 10, where the transmitters (i.e., power sources 210a-g) and the receivers 216a-g each have the same axial length along the coil antenna 206. The multiple transmitters can be operated sequentially. By considering in each case the measurements of the receiver 216a-g closest to the active transmitter, those measurements, in case there is symmetry along the axial direction of the wellbore 104, would be identical. However, when the pipes 108a,b contain defects that break the symmetry along the axial direction of the wellbore 104, the cancellation will not be exact, with the difference being caused by the presence of the defect. The subtraction of these response signals will result in relatively small voltages. To reduce the error in the measurement of the differences it is convenient to subtract them in hardware and measure the difference directly.

Figure 12:
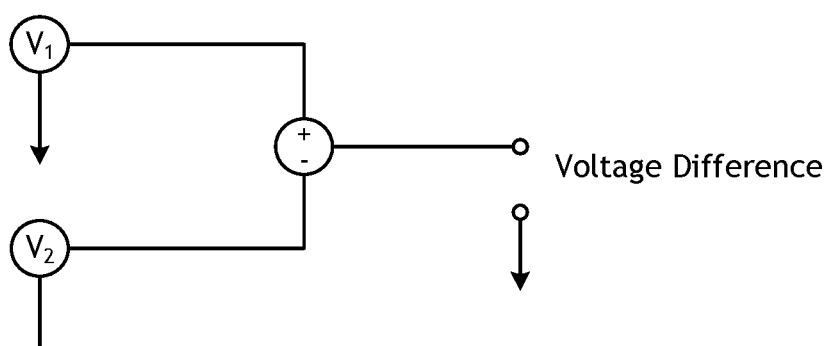
FIG. 12 is a schematic diagram of processing response signals as voltages.

This process is schematically illustrated in FIG. 12, which shows that the difference is measured directly instead of being evaluated from the measurements of $V_1$ and $V_2$. Different combinations of voltage differences can be generated and all should be considered as expressly included in this disclosure. The use of difference measurements can improve the inversion of pipe thickness, as described in more detail below, and the voltage differences should be considered as included in the voltage measurement there described. As stated above, the signals can be combined by using weighted averages, with weight numbers being positive or negative, and then adding the weighted signals to generate a combined signal that can be used to extract information about the pipes 108a,b.

Figure 13:
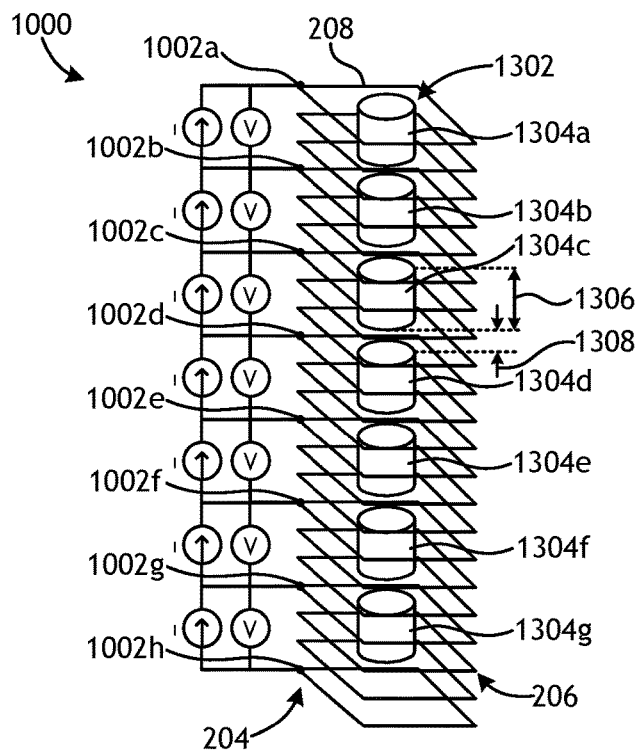
FIG. 13 is a schematic diagram of another embodiment of the electromagnetic sensor of FIG. 10.

Referring now to FIG. 13, with continued reference to FIG. 10, illustrated is a schematic diagram of another embodiment of the electromagnetic sensor 1000 of FIG. 10. When an excitation signal is applied between different terminals 1002a-h of the coil antenna 206, an unwanted coupling may be formed due to the presence of a ferrite core 1302, about which the coil winding 208 may be wound and which is typically used to amplify (boost) the magnetic fields generated by the coil antenna 206. This is due to magnetic fields that complete the magnetic circuit using the shortest path that is available, which is through the material of the core 1302, which is typically a magnetically-permeable material.

In order to avoid this, and in accordance with the present embodiment, the core 1302 may be segregated or otherwise subdivided into multiple pieces or core segments 1304, shown as core segments 1304a, 1304b, 1304c, 1304d, 1304e, 1304f, and 1304g. Segregating the core 1302 into the multiple core segments 1304a-g may allow magnetic fields to escape the material of the core 1302 at the axial ends of each core segment 1304a-g if they have an incentive to do so, such as in the event the return path is short geometrically. Each subdivided core segment 1304a-g may exhibit an axial length 1306 and may be axially separated or offset from an adjacent core segment 1304a-g by a gap 1308. The magnetic fields generated by the coil antenna 206 may be able to escape the coil antenna 206 at the gap 1308 defined between axially adjacent core segments 1304a-g.

In some embodiments, axially adjacent core segments 1304a-g may be separated by a gap 1308 that is one-fifth the axial length 1306 of each core segment 1304a-g. In other embodiments, axially adjacent core segments 1304a-g may be separated by a gap 1308 that is one-third the axial length 1306 of each core segment 1304a-g. In yet other embodiments, axially adjacent core segments 1304a-g may be separated by a gap 1308 that is equal to the axial length 1306 of each core segment 1304a-g, without departing from the scope of the disclosure. The distance between the terminals 1002a-h is an integer multiple of the total size of the core segments 1304a-g, so that each consecutive terminal 1002a-h is magnetically decoupled for obtaining as diverse information as possible.

It is also possible to decouple the magnetic fields by using an excitation in the opposite direction from a different combination of terminals 1002a-g. In general, for the general case of N+1 terminals, N excitation sources and N receivers, as shown in FIG. 13, one can write the total vector of measured voltages in a case with the core 1302 and no pipes 108a,b (FIG. 10) present as follows:

$$\begin{bmatrix} Z_{11} & \cdots & Z_{1N} \\ \vdots & & \vdots \\ Z_{N1} & \cdots & Z_{NN} \end{bmatrix} \begin{bmatrix} I_1 \\ \vdots \\ I_N \end{bmatrix} = \begin{bmatrix} V_1 \\ \vdots \\ V_N \end{bmatrix} \quad \text{Equation (1)}$$

where $Z_{ij}$ is the voltage at the i'th receiver, when only the j'th exciter is activated with unit current (also called mutual impedance), $I_i$ is the adjusted current of i'th exciter, and $V_i$ is the voltage of the i'th receiver, all for the case with the core 1302 and without any pipes. As it can be seen by Equation (1), it may be possible to adjust the currents $I_i$ to obtain a desired total voltage $V_i$. A similar equation can be written for a case where no core 1302 and no pipe is present:

$$\begin{bmatrix} Z'_{11} & \cdots & Z'_{1N} \\ \vdots & & \vdots \\ Z'_{N1} & \cdots & Z'_{NN} \end{bmatrix} \begin{bmatrix} I'_1 \\ \vdots \\ I'_N \end{bmatrix} = \begin{bmatrix} V'_1 \\ \vdots \\ V'_N \end{bmatrix} \quad \text{Equation (1)}$$

where $V'_{ij}$ is the voltage at the i'th receiver, when only the j'th exciter is activated with unit current (also called mutual impedance), $I'_i$ is the adjusted current of i'th exciter, and $V'_i$ is the voltage of the i'th receiver, all for the case without the core and without any pipes. In order to use a pipe inspection tool with the core 1302 (i.e., to have improvements in signal strength) but obtain results that are as decoupled as a pipe inspection tool without the core 1302, the following currents equation may be used instead:

$$\begin{bmatrix} I_1 \\ \vdots \\ I_N \end{bmatrix} = \begin{bmatrix} Z_{11} & \cdots & Z_{1N} \\ \vdots & & \vdots \\ Z_{N1} & \cdots & Z_{NN} \end{bmatrix}^{-1} \begin{bmatrix} Z'_{11} & \cdots & Z'_{1N} \\ \vdots & & \vdots \\ Z'_{N1} & \cdots & Z'_{NN} \end{bmatrix} \begin{bmatrix} I'_1 \\ \vdots \\ I'_N \end{bmatrix} \quad \text{Equation (3)}$$

Alternatively, a correction on the voltages could be used, as follows:

$$\begin{bmatrix} V_1 \\ \vdots \\ V_N \end{bmatrix} = \begin{bmatrix} Z_{11} & \cdots & Z_{1N} \\ \vdots & & \vdots \\ Z_{N1} & \cdots & Z_{NN} \end{bmatrix}^{-1} \begin{bmatrix} Z'_{11} & \cdots & Z'_{1N} \\ \vdots & & \vdots \\ Z'_{N1} & \cdots & Z'_{NN} \end{bmatrix} \begin{bmatrix} V'_1 \\ \vdots \\ V'_N \end{bmatrix} \quad \text{Equation (4)}$$

Computation of impedances, $Z_{ij}$, for the decoupling operation above can be performed through modeling or experiments by individually exciting each coil and measuring the signal at all other coils. For example, In order to calculate the first row of the impedance matrix in Equation (1), current in exciter 1 can be set to 1 Ampere, and all other currents can be set to 0. Resulting voltages at the receivers can be normalized to 1 Ampere to produce the impedances in the first column of the impedance matrix.

Figure 14:
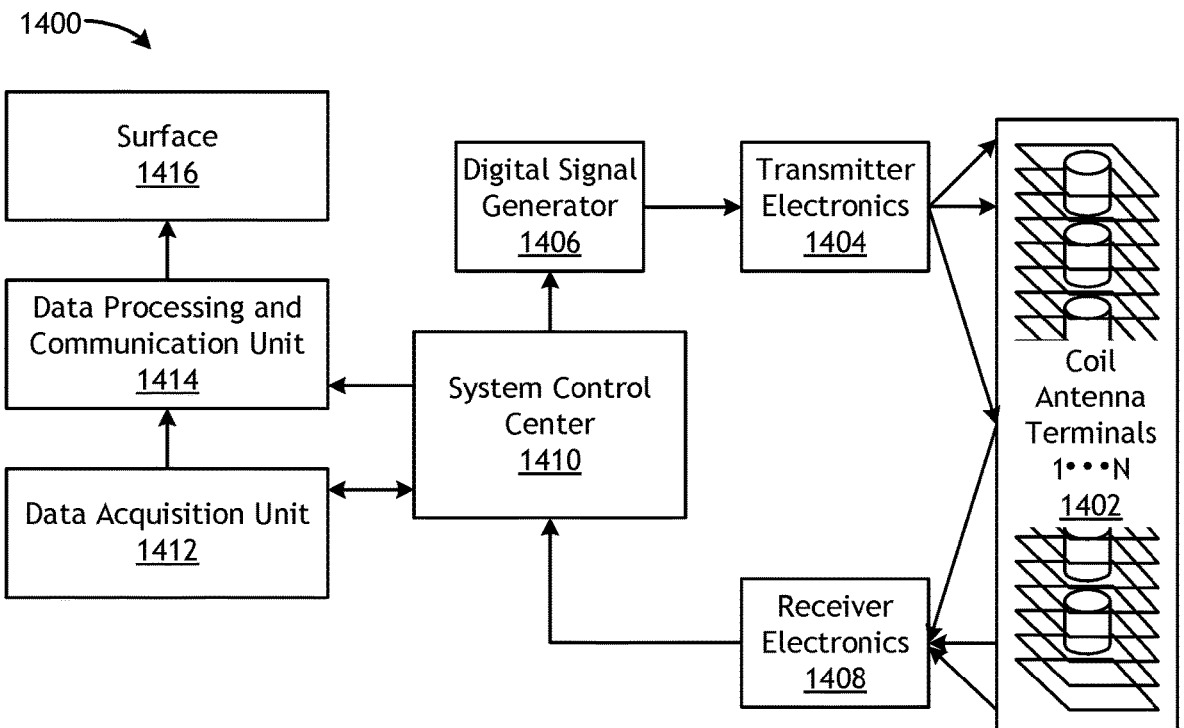
FIG. 14 is a block diagram of an exemplary data acquisition and control system used for monitoring pipes in a wellbore.

Referring now to FIG. 14, illustrated is a block diagram of an exemplary data acquisition and control system 1400 that may be used for monitoring pipes in a wellbore, according to one or more embodiments of the present disclosure. Those skilled in the art will readily appreciate that the data acquisition and control system 1400 as described herein is merely one example of a wide variety of data acquisition systems that can operate in accordance with the principles of this disclosure. Accordingly, the data acquisition and control system 1400 is not to be limited solely to the specific details described herein and other changes or alterations to the structure and processing capabilities may be introduced without departing from the scope of the disclosure.

As illustrated, the data acquisition and control system 1400 may include at least one coil antenna 1402, which may be the same as or similar to the coil antenna 206 shown in any of the embodiments described herein. The coil antenna 1402 may be driven by transmitter electronics 1404, which may include one or more transmitters, a demultiplexer, a digital-to-analog converter, and other modules or devices used to support operation of the transmitters. Each transmitter may be configured to transmit at least one signal at a particular frequency and, depending on the monitoring application, multiple signals may be transmitted at different frequencies. In some embodiments, a signal generator 1406 may be configured to generate the signals for transmission by the transmitters, the digital-to-analog converter may be configured to convert digital signals to analog signals, and the demultiplexer may be configured to selectively couple the signal generator 1406 to the transmitters. As will be appreciated, any combination of one or more signal generators 1406, digital-to-analog converters, and demultiplexers may be used to drive the transmitters. Alternatively, the transmitters may each perform the function of the signal generator 1406, and the separate signal generator 1406 as part of the transmitter electronics 1404 may be omitted from the data acquisition and control system 1400.

Signals from the coil antenna 1402 may be received with receiver electronics 1408, which may include one or more receivers, an analog-to-digital converter, and other modules or devices used to support operation of the receivers. A system control center 1410 may communicably couple the receiver electronics 1408 to the transmitter electronics 1404 and thereby control overall operation of the data acquisition and control system 1400. As illustrated, the system control center 1410 may further be communicably coupled to at least a data acquisition unit 1412 and a data processing and communication unit 1414, thereby placing the receiver electronics 1408 also in communication with such components. In some embodiments, the data acquisition unit 1412 may be configured to determine an amplitude and/or a phase of a received signal. The acquired signal information may be stored, along with acquisition time information in a data buffer of the data acquisition unit 1412. The data buffer may be useful when pipe characteristics are determined based on signals received at different times and/or at different positions within a wellbore.

Data processing may be performed at the earth's surface or at a downhole location where the data acquisition and control system 1400 is arranged. If the data processing is to be performed at the surface, the acquired signal information from the receiver electronics 1408, the data acquisition unit 1412, and the buffered signal information from the data buffer may be conveyed to the data processing and communication unit 1414 which may be configured to transmit the data to the surface 1416 and to a computer or other processing system (not shown) arranged at the surface 1416. If the data processing is to be performed downhole, the data processing and communication unit 1414, in conjunction with the other components of the data acquisition and control system 1400, may be configured to perform the necessary data processing.

Both the computer at the surface 1416 and the system control center 1410 may include multiple processors and a memory configured to receive and store data. The memory may be any non-transitory machine-readable medium that has stored therein at least one computer program with executable instructions that cause the processor(s) to perform the data processing on the received signals. The memory may be, for example, random access memory (RAM), flash memory, read only memory (ROM), programmable read only memory (PROM), electrically erasable programmable read only memory (EEPROM), registers, hard disks, removable disks, a CD-ROM, a DVD, any combination thereof, or any other suitable storage device or medium.

Since the system control center 1410 is coupled to various components of the data acquisition and control system 1400, the system control center 1410 may be configured to adjust or otherwise regulate various parameters of the data acquisition and control system 1400 in order to optimize operation. For example, the system control center 1410 may control the frequencies generated by the signal generator 1406 in the transmitter electronics 1404 or the transmitters. The system control center 1410 may also control the timing of the transmitters. For instance, the system control center 1410 may cause the transmitters to operate sequentially or according to a predetermined transmission sequence such that time-lapse measurements or signals may be obtained by the receivers. From the received signals, characteristics of the pipes may be calculated and otherwise extracted.

More particularly, the excitation and measurement is performed between a number of terminals (1 . . . N) of the coil antenna 1402. It is possible to excite and measure between the same combination of terminals of the coil antenna 1402, which constitutes a self-impedance measurement. It is also possible to excite and measure between a different combination of terminals of the coil antenna 1402, which constitutes a mutual impedance measurement. While such measurements are taking place, other ports of the coil antenna 1402 may be shorted (in case of voltage-controlled sources) or opened (in case of current-controlled sources).

In general, excitation may be activated by the system control center 1410 and a time-varying signal may be generated by an amplifier included in the signal generator 1406, which is typically converted to analog from digital by using the digital-to-analog converter in the transmitter electronics 1404. The time-varying signal may be sinusoidal with the phase and amplitude of it controlled to a desired value. Typical operating frequency of such a system is between 0.1-1000 Hz. High frequencies suffer attenuation in pipes due to small skin depth, and low frequencies suffer low signal level due to the inductive nature of the measurement. The excitation may also be a pulse of different shapes such as rectangular or triangular pulses.

The resulting magnetic fields that are generated are coupled electromagnetically to the features of the pipes that are next to the antenna coils 1402. At low frequencies, coupling is only through magnetic permeability, but at higher frequencies, conductivity may also be important due to decreasing skin depth. Detected defects in the pipes generate differences in magnetic fields either through magnetic permeability coupling or through conductivity coupling. These changes contain information about the features of the pipes and they are recorded by the receiving antenna of the receiver electronics.

In the case of frequency-domain operation, the received signals can be represented as voltage or current numbers in complex domain with real and imaginary parts, in phasor domain as amplitude and phase, or any other domain that can be obtained by analytical mapping from any of these domains. In the time-domain operation, received signals are magnitudes as a function of time, which can be positive or negative. Results from time and frequency domain can be transferred from one to another by using Fourier transform or inverse Fourier transform. Results may be transferred from analog to digital domain through the use of the analog-to-digital converter included in the receiver electronics 1408. The results may be normalized by the excitation magnitude (excitation current in case of current controlled excitation, excitation voltage in case of voltage controlled excitation), which can yield an impedance measurement.

In addition to the eddy currents that exhibit pipe feature information, a direct coupling from the transmitters to the receivers exists. This direct coupling can be removed by software through the use of an additive term, which is computed in an air calibration step. Yet, another method is to use pulsed excitation with temporally separated transmitting and receiving cycles. In the listening period, the direct coupling dies out polynomially or exponentially and only reflections, scattering or eddy currents from the features are received. In the sinusoidal type excitation, the length of the listening period determines the signal-to-noise ratio (SNR) of the system. Longer listening times are required to improve SNR, while this also causes slower logging speeds for a fixed vertical resolution for the system.

The sampling frequency also can be optimized to reduce noise while producing enough definition in time to resolve pipe features at different distances to the tool. Listening time is also an important parameter, since features of pipes that are far away mostly arrive at late time. Since downhole memory is limited, it is important to minimize listening time while still maintaining the sensitivity to features that are further away from the tool such as second or third pipe features. For a specific transmitter excitation, multiple receivers can be recorded at the same time. Similarly, multiple excitations and measurements can be performed at the same time and they can be time, frequency or jointly multiplexed for latter demultiplexing operation at the receiver. Upon reception of the signals, they are digitized, stored in a buffer, preprocessed and sent to the surface 1416 using the data processing and communication unit 1414. The data is later inverted and the results of the inversion or raw data can be visualized. Decisions on what to do with the pipes being monitored can be made based on the visualization logging or production.

Figure 15:
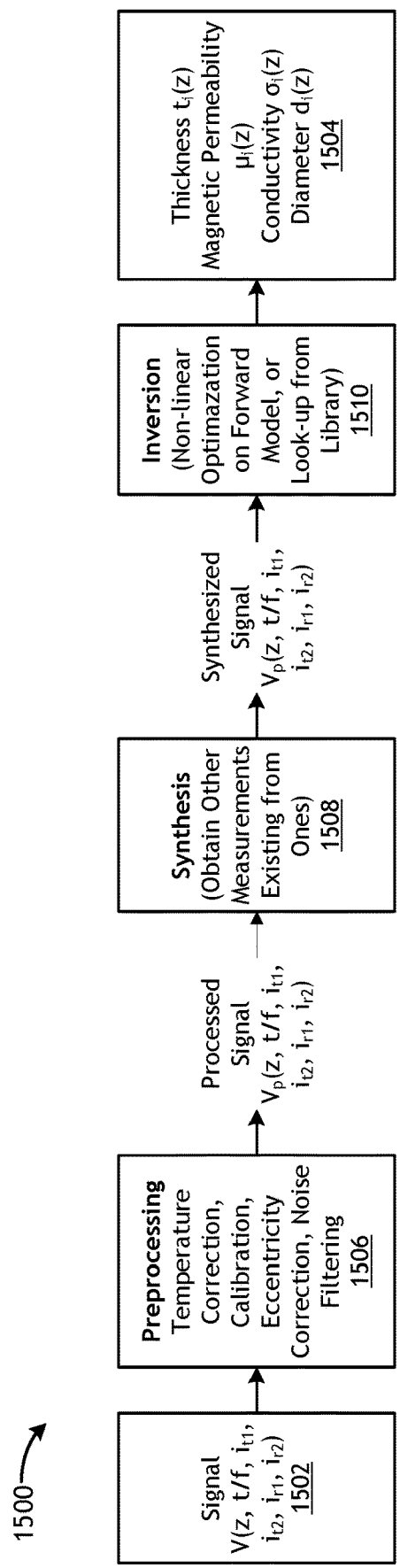
FIG. 15 is a schematic flowchart of a method of converting measurement data into one or more pipe characteristics.

Referring now to FIG. 15, illustrated is a schematic flowchart of a method 1500 of converting measurement data 1502 into one or more pipe characteristics 1504, according to one or more embodiments of the present disclosure. More particularly, the method 1500 may take measurement data 1502 in the form of impedance signals V and convert them into one or more pipe characteristics such as, but not limited to, thickness, magnetic permeability, conductivity, and diameter measurements of any of the pipes.

In the illustrated method, a signal V is measured at time t (time-domain operation) or frequency f (frequency domain operation) at antenna depth z between the antenna terminals $i_{r1}$ and $i_{r2}$ as a result of excitation between the ports $i_{t1}$ and $i_{t2}$. The received signal V may then be preprocessed, as at 1506. Preprocessing the measurement data 1502 may include performing temperature corrections through the use of correlation tables or performing "software focusing" to remove drifts in the electronics. Preprocessing the measurement data 1502 may also include calibration, which may include normalization with the excitation signal amplitude, eccentricity (stand-off) correction, to remove the effect of a sensor pad (if used) not touching the pipe, and temporal or spatial filters to reduce noise.

The preprocessed signal Vp may then be optionally synthesized to obtain other measurements from existing measurements, as at 1508. This may be accomplished by synthesizing measurements from any combination of exciter terminals to any combination of receiver terminals by summing different transmitter and receiver measurements. In a most general case, as stated before, the synthesized signal can be generated by using weighted averages of multiple receiver signals measured at multiple pairs of receivers, with weight 1 equivalent to a sum, weight −1 equivalent to a subtraction, and any other weight possible depending on the convenience in processing the data. A synthesized and/or preprocessed signal Vp may then be fed to an inversion algorithm, as at 1510, which looks up the measured signal in a database that contains mappings between modeled signals and pipe features (thickness, magnetic permeability, conductivity and diameter). The pipe characteristics corresponding to the modeled signal that matches with least mismatch with the measured processed signal is selected. This formulation can be written as follows:

$$(\bar{t}(z), \bar{\mu}(z), \bar{\sigma}(z), \bar{d}(z)) = \arg\min_{\bar{t}, \bar{\mu}, \bar{\sigma}, \bar{d}} \left( \sum_{t/f, i_{t1}, i_{t2}, i_{r1}, i_{r2}} \left( \begin{array}{c} V_p(z, t/f, i_{t1}, i_{t2}, i_{r1}, i_{r2}) - \\ V_m(t, \mu, \sigma, d, t/f, i_{t1}, i_{t2}, i_{r1}, i_{r2}) \end{array} \right)^2 \right) \quad \text{Equation (5)}$$

where t(z) is the inverted vector of pipe thicknesses, μ(z) is the inverted vector of pipe magnetic permeabilities, σ(z) is the inverted vector of pipe conductivities, d(z) is the inverted vector of pipe diameters, $V_m$ is the modeled (and processed) measurement, t is the vector of pipe thicknesses of the model, μ is the vector of pipe magnetic permeabilities of the model, σ is the vector of pipe conductivities of the model, and d is the vector of pipe diameters of the model. The foregoing vectors contain information related to a number of pipes, i.e., first element of the vector is the characteristic associated with the first pipe, the second element of the vector is the characteristic associated with the second pipe, etc.

Different cost functions that involve weighted differences and different norms may be used. If a quick forward model is available, search of the above minimum may be conducted by using an iterative method, such as conjugate gradient, etc., in the place of the database lookup. It is also possible use lab measurements in the place of computer models. A range of pipes with different features may be measured and measured signals may be used to construct a library. In the case the decoupling method that described by Equation (3) above is applied to the excitation current, the same method should be applied to the model described above.

Embodiments Disclosed Herein Include:

A. A method that includes introducing a pipe inspection tool into a first pipe positioned within a wellbore and further positioned within at least a second pipe, the pipe inspection tool including an electromagnetic sensor having a coil antenna that includes a coil winding extending axially along at least a portion of the electromagnetic sensor, transmitting an excitation signal between a first terminal and a second terminal of the coil antenna, measuring a first response signal between a third terminal and a fourth terminal of the coil antenna, wherein at least one of the third and fourth terminals is different from the first and second terminals, and processing the first response signal to determine a characteristic of the first pipe.

B. A method that includes introducing a pipe inspection tool into a first pipe positioned within a wellbore and further positioned within at least a second pipe, the pipe inspection tool including an electromagnetic sensor having a coil antenna that includes a coil winding extending axially along at least a portion of the electromagnetic sensor, transmitting a first excitation signal between a first terminal and a second terminal of the coil antenna, measuring a first response signal between the first and second terminals, transmitting a second excitation signal between a third terminal and a fourth terminal of the coil antenna, where the third and fourth terminals are different from the first and second terminals, measuring a second response signal between the third and fourth terminals, and processing the first and second signals to determine a characteristic of one or both of the first and second pipes.

C. A method that includes introducing a pipe inspection tool into a first pipe positioned within a wellbore and further positioned within at least a second pipe, the pipe inspection tool including an electromagnetic sensor having a coil antenna that includes a coil winding extending axially along at least a portion of the electromagnetic sensor, transmitting a first excitation signal between a first terminal and a second terminal of the coil antenna, measuring a first response signal between the first and second terminals, measuring a second response signal between the second terminal and a third terminal of the coil antenna, summing the first and second response signals to obtain a summed response signal indicative of a measurement between the first and third terminals, and processing the summed response signal to determine a characteristic of at least one of the first and second pipes.

D. A method that includes introducing a pipe inspection tool into a first pipe positioned within a wellbore and further positioned within at least a second pipe, the pipe inspection tool including an electromagnetic sensor having a coil antenna that includes a coil winding extending axially along at least a portion of the electromagnetic sensor, selecting a number of consecutive terminals on the coil antenna, transmitting an excitation signal between each neighboring terminal of the consecutive terminals of the coil antenna, receiving and recording a corresponding response signal for each excitation signal between each neighboring terminal, adding a subset of the response signals for each excitation signal between any two terminals of the number of consecutive terminals to obtain a synthesized signal, and processing the synthesized signal to determine a characteristic of at least one of the first and second pipes.

Each of embodiments A, B, C, and D may have one or more of the following additional elements in any combination: Element 1: wherein transmitting the excitation signal comprises transmitting a time-domain or frequency-domain (steady-state) signal generated by a power source electrically-coupled to the first and second terminals. Element 2: wherein measuring the first response signal between the third terminal and the fourth terminal comprises receiving the first response signal with a receiver electrically-coupled to at least one of the third and fourth terminals and included in the electromagnetic sensor. Element 3: further comprising measuring a second response signal between a fifth terminal and a sixth terminal of the coil antenna, where an axial length of the coil antenna between the fifth and sixth terminals is longer than an axial length of the coil antenna between the third and fourth terminals, and processing the first and second response signals to determine a characteristic of one or both of the first and the second pipes. Element 4: wherein an axial length of the coil antenna between the third and fourth terminals is longer than an axial length of the coil antenna between the first and second terminals, the method further comprising processing the first response signal to determine a characteristic of the second pipe. Element 5: wherein the coil winding is wound about a segmented core comprising a plurality of core segments. Element 6: wherein each core segment exhibits an axial length and is axially separated from an adjacent core by a gap, and wherein the gap is at least one-fifth or more of the axial length of each adjacent core segment.

Element 7: wherein transmitting the first excitation signal comprises transmitting a first time-domain or frequency-domain (steady-state) signal generated by a first power source electrically-coupled to the first and second terminals, and wherein transmitting the second excitation signal comprises transmitting a second time-domain or frequency-domain (steady-state) signal generated by a second power source electrically-coupled to the third and fourth terminals. Element 8: wherein measuring the first response signal between the first terminal and the second terminal comprises receiving the first response signal with a first receiver electrically-coupled to the first and second terminals and included in the electromagnetic sensor, and wherein measuring the second response signal between the third terminal and the fourth terminal comprises receiving the second response signal with a second receiver electrically-coupled to the third and fourth terminals and included in the electromagnetic sensor. Element 9: wherein the coil winding is wound about a segmented core comprising a plurality of core segments. Element 10: wherein each core segment exhibits an axial length and is axially separated from an adjacent core by a gap, and wherein the gap is at least one-fifth or more of the axial length of each adjacent core segment.

Element 11: further comprising subtracting the first and second response signals to obtain a difference response, and processing the difference response to determine the characteristic of at least one of the first and second pipes. Element 12: wherein transmitting the excitation signal comprises transmitting a time-domain or frequency-domain (steady-state) signal generated by a power source electrically-coupled to the first and second terminals. Element 13: wherein measuring the first response signal between the first terminal and the second terminal comprises receiving the first response signal with a first receiver electrically-coupled to the first and second terminals and included in the electromagnetic sensor, and wherein measuring the second response signal between the second terminal and the third terminal comprises receiving the second response signal with a second receiver electrically-coupled to the second and third terminals and included in the electromagnetic sensor. Element 14: wherein the coil winding is wound about a segmented core comprising a plurality of core segments. Element 15: wherein each core segment exhibits an axial length and is axially separated from an adjacent core by a gap, and wherein the gap is at least one-fifth or more of the axial length of each adjacent core segment.

Element 16: further comprising combining the subset of the response signals for each excitation signal between any two terminals by one of addition, subtraction, or a weighted sum, where weights of the weighted sum are positive or negative numbers, and processing the synthesized signal to determine the characteristic of at least one of the first and second pipes. Element 17: wherein the coil winding is wound about a segmented core comprising a plurality of core segments. Element 18: wherein each core segment exhibits an axial length and is axially separated from an adjacent core by a gap, and wherein the gap is at least one-fifth or more of the axial length of each adjacent core segment.

By way of non-limiting example, exemplary combinations applicable to A, B, C, and D include: Element 5 with Element 6; Element 9 with Element 10; Element 14 with Element 15; and Element 17 with Element 18.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method, comprising:
    introducing a pipe inspection tool into a first pipe positioned within a wellbore and further positioned within at least a second pipe, the pipe inspection tool including an electromagnetic sensor having a coil antenna that includes a coil winding extending axially along at least a portion of the electromagnetic sensor;
    transmitting an excitation signal between a first terminal and a second terminal of the coil winding;
    measuring a first response signal between a third terminal and a fourth terminal of the coil winding, wherein at least one of the third and fourth terminals is different from the first and second terminals; and
    processing the first response signal to determine a characteristic of the first pipe;
    wherein the coil winding is composed of a single strand of wire that is electrically continuous such that the first, second, third, and fourth terminals are on the single strand of wire;
    wherein the first terminal is coupled in series to first power source, the second terminal is coupled in series to a second power source, the third terminal is coupled in series to a third power source, and the fourth terminal is coupled in series to a corresponding fourth power source.

2. The method of claim 1, wherein the transmitting the excitation signal comprises transmitting a time-domain or frequency-domain (steady-state) signal generated by one of the first and second power source.

3. The method of claim 1, wherein the measuring the first response signal between the third terminal and the fourth terminal comprises receiving the first response signal with a receiver electrically-coupled to at least one of the third and fourth terminals and included in the electromagnetic sensor.

4. The method of claim 1, wherein the coil winding is wound about a segmented core comprising a plurality of core segments.

5. The method of claim 4, wherein each core segment exhibits an axial length and is axially separated from an adjacent core segment by a gap, and wherein the gap is at least one-fifth or more of the axial length of each adjacent core segment.

6. The method of claim 1, wherein the coil winding has a continuous winding pattern that extends axially between opposing ends of the coil antenna.

* * * * *